United States Patent
Linhoff et al.

(10) Patent No.: US 6,529,106 B1
(45) Date of Patent: Mar. 4, 2003

(54) ELECTROMAGNETIC VALVE

(75) Inventors: Paul Linhoff, Neu-Anspach (DE); Kerstin Rosenkranz, Schmitten (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/647,122

(22) Filed: Jan. 25, 2001

(30) Foreign Application Priority Data

Mar. 31, 1998 (DE) ......................................... 198 14 304
Aug. 12, 1998 (DE) ......................................... 198 36 494

(51) Int. Cl.$^7$ .............................................. H01H 45/00
(52) U.S. Cl. ................... 335/220; 251/129.15
(58) Field of Search ................. 335/251, 255, 335/257, 266–269; 251/129.01–129.2

(56) References Cited

U.S. PATENT DOCUMENTS

| | | | | |
|---|---|---|---|---|
| 5,167,442 A | * | 12/1992 | Alaze et al. | 251/129.02 |
| 5,333,836 A | * | 8/1994 | Fukuyo et al. | 251/129.15 |
| 5,511,864 A | * | 4/1996 | Reinartz et al. | 251/129.15 |
| 5,810,330 A | * | 9/1998 | Eith et al. | 251/129.19 |
| 5,944,047 A | * | 8/1999 | Veret et al. | 251/129.15 |

FOREIGN PATENT DOCUMENTS

| | | |
|---|---|---|
| DE | 41 37 123 | 5/1993 |
| DE | 4211307 | * 10/1993 |
| DE | 42 36 482 | 5/1994 |
| DE | 195 04 883 | 8/1995 |
| DE | 44 32 046 | 3/1996 |
| DE | 195 28 726 | 3/1996 |
| DE | 195 29 724 | 2/1997 |
| DE | 196 04 315 | 8/1997 |
| DE | 196 04 316 | 8/1997 |
| DE | 196 04 317 | 8/1997 |
| DE | 196 11 832 | 10/1997 |
| DE | 196 24 377 | 1/1998 |
| DE | 196 35 690 | 3/1998 |
| DE | 196 35 691 | 3/1998 |
| DE | 196 35 693 | 3/1998 |

OTHER PUBLICATIONS

Search Report of the German Patent Office for Application No. 198 36 494.6 (No Date).

* cited by examiner

*Primary Examiner*—Lincoln Donovan
(74) *Attorney, Agent, or Firm*—Rader, Fishman & Grauer PLLC

(57) ABSTRACT

The present invention relates to an electromagnetic valve of a cartridge-type construction comprised of a magnetic core, a magnetic armature (12) with valve closure member (4), and a valve seat member which form an operative unit in a valve housing, the said valve housing including a closed sleeve portion (1) which has a collar (17) on the opposite open end area for attachment in the valve housing. Inserted telescopically into the open end area of the sleeve portion (1) is a sleeve-shaped annular part (2) which carries the valve seat member (3) and aligns the latter concentrically in relation to the valve closure member (4) to form an operative unit.

23 Claims, 3 Drawing Sheets

ELECTROMAGNETIC VALVE

TECHNICAL FIELD

The present invention generally relates to valves and more particularly relates to an electromagnetic valve for use in hydraulic brake systems.

BACKGROUND OF THE INVENTION

DE 196 24 377 A1 discloses an electromagnetic valve of this type which includes a magnetic core, a magnetic armature with a valve closure member, and a valve seat member as preadjusted components that are preassembled in a valve housing to form an operative valve unit. The valve housing includes a dome-shaped sleeve portion which abuts with the open collar-shaped end area on a supporting plate that is mounted in a bore of the cartridge-type valve housing. The bore is encompassed by a thick-walled valve housing portion which is deformed to a calked shape on the exterior.

One shortcoming is related to the adjustment of the magnetic armature stroke by means of an adjusting pin that has to be adjusted in the magnetic core before the collar is calked in the cartridge.

In DE-A-195 29 724 an electromagnetic valve is described which has a valve member in a valve housing which is actuatable in response to the valve operating position of a valve closure member that abuts on the valve member in the initial position, to what end a spring-applied entraining means guided in the valve housing is in engagement with the valve member and with a tappet-shaped extension on the valve closure member.

An object of the present invention is to manufacture an electromagnetic valve of the type initially referred to by means which are as simple, inexpensive and reliable as possible, with the valve being distinguished by a miniaturized, especially slim design.

DETAILED DESCRIPTION OF THE PREFERRED EMBODIMENTS

Figure 1:
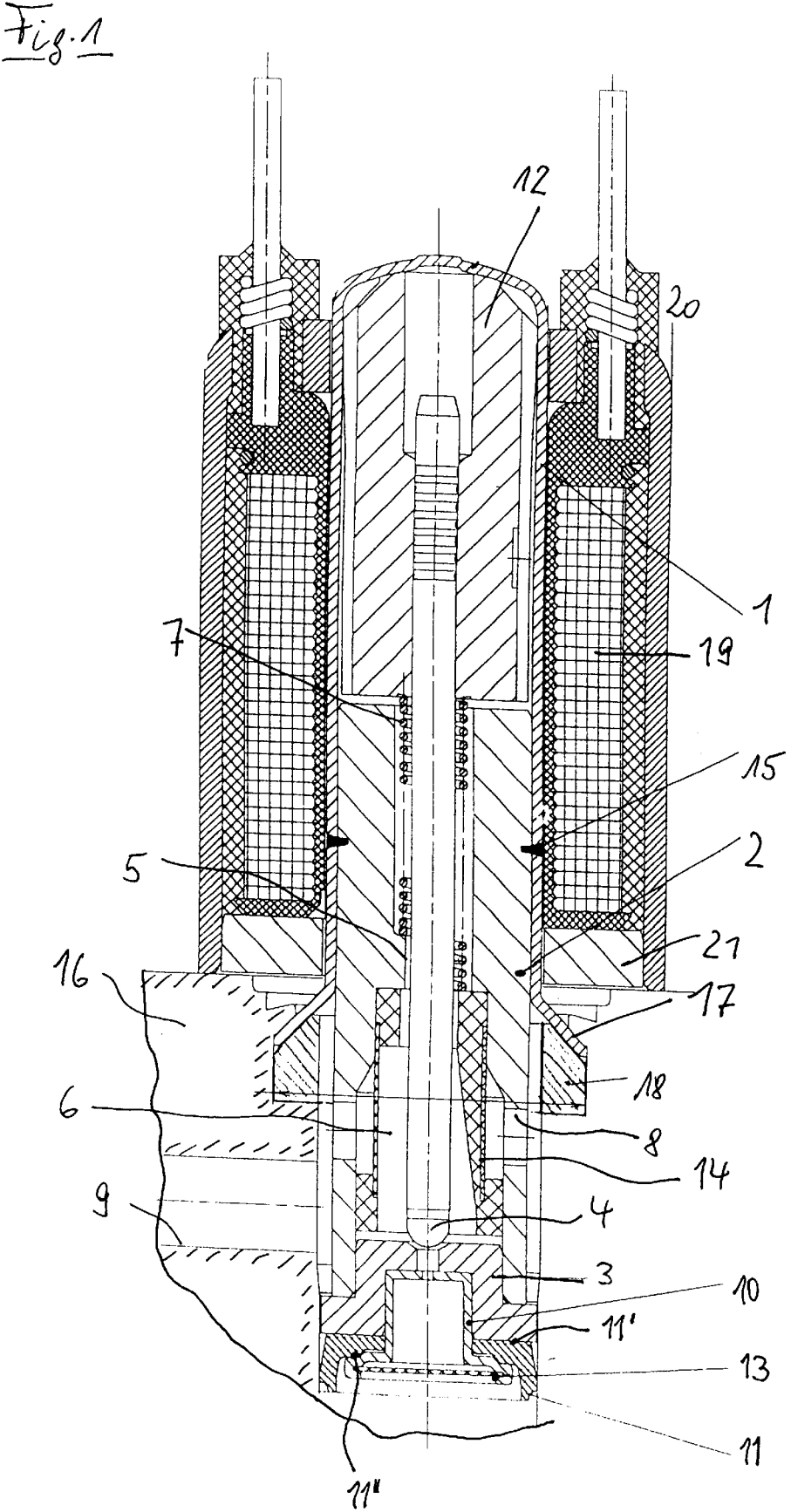
FIG. 1 is a first embodiment of an open two-way/two-position directional control valve which is not energized electromagnetically in its initial position.

The embodiment of FIG. 1 shows a considerably enlarged cross-sectional view of an electromagnetic valve having a magnetic core which forms the annular part 2 that is essential to the present invention. The annular part 2, configured as a cartridge closure means, is inserted telescopically into the open end area of a sleeve portion 1 that guides the magnetic armature 12 so that the stroke of the magnetic armature can be adjusted by the extent the annular part 2 is slipped into the sleeve portion 1. Remote from the sleeve portion 1 on the annular part 2 is valve seat member 3 which is press fitted until abutment on the annular part 2 in the present embodiment. According to the embodiment of FIG. 1, the valve seat member 3 includes a housing step into which, in turn, a diaphragm retainer 10 is press fitted, at the peripheral surface of which an annular gasket 11 is guided. The outside and inside shoulders 11', 11" of the annular gasket 11 are compressed over a large surface between the end surfaces of the valve seat member 3 and the diaphragm retainer 10. The advantage is that no undesirable deformation occurs at the annular gasket 11 that is configured as a non-return valve when fluid flows along the gasket lip. The undesirable deformation of the gasket has so far been prevented by special measures which obstruct the flow cross-section.

As can be seen in FIG. 1, the diaphragm retainer 10 along with the valve seat member 3 and the non-return gasket 11 forms a subassembly which is press fitted into the bottom end of the annular part 2 until abutment thereon without special adjusting measures.

A plate-type filter is provided in the diaphragm retainer 10 to filter the pressure fluid flow in the present embodiment, while an annular filter 14 is positioned in the area of the transverse bore 8 in the annular part 2.

The adjustment of the electromagnetic valve is thus limited, on the one hand, to the displacement of the magnetic armature 12 on the tappet-shaped portion of the valve closure member 4 until the desired residual air slot between the end surfaces of the magnetic armature 12 and the diametral annular part 2 is reached. On the other hand, it is limited to slipping in or press fitting the annular part 2 into the sleeve portion 1 until the desired valve stroke is reached. Subsequently, the sleeve portion 1 is coupled to the annular part 2 by means of a welding seam 15 to secure the adjusted position. The result is an especially slim operative valve cartridge which is inserted into a stepped bore of a block-shaped accommodating member 16, for example, and is calked in the area of the collar 17 spread apart at the sleeve portion 1. To this end, the material of the accommodating member 16, in the area of the bore step, is press fitted to the inclined surface of the collar 17 by means of an exterior calking tool. A supporting plate 18 made of high-strength steel is arranged below the collar 17 in the stepped bore to accommodate the relatively great calking force. The use of the supporting plate 18 is appropriate in the event that the accommodating member 16 is made of a relatively soft material, for example, a light metal. When the accommodating member 16 is made of steel, this obviates the need for the supporting plate 18. Beneath the supporting plate 18, the transverse bore 8 connects the stepped bore 6 to the pressure fluid conduit 9 in the accommodating member 16 so that in the open position of the electromagnetic valve according to the drawing, an unimpaired hydraulic connection to a pressure fluid channel which is continued below the plate-type filter 13 is established.

It should be noted in addition that the dome-shaped sleeve portion 1 and the annular part 2 are made of a ferritic steel which ensures that both parts can properly be welded to each other. According to the drawings, the sleeve portion 1 carries a magnet valve coil 19 which contacts with its yoke ring 20 a magnet end plate 21 proximate the collar 17.

Figure 2:
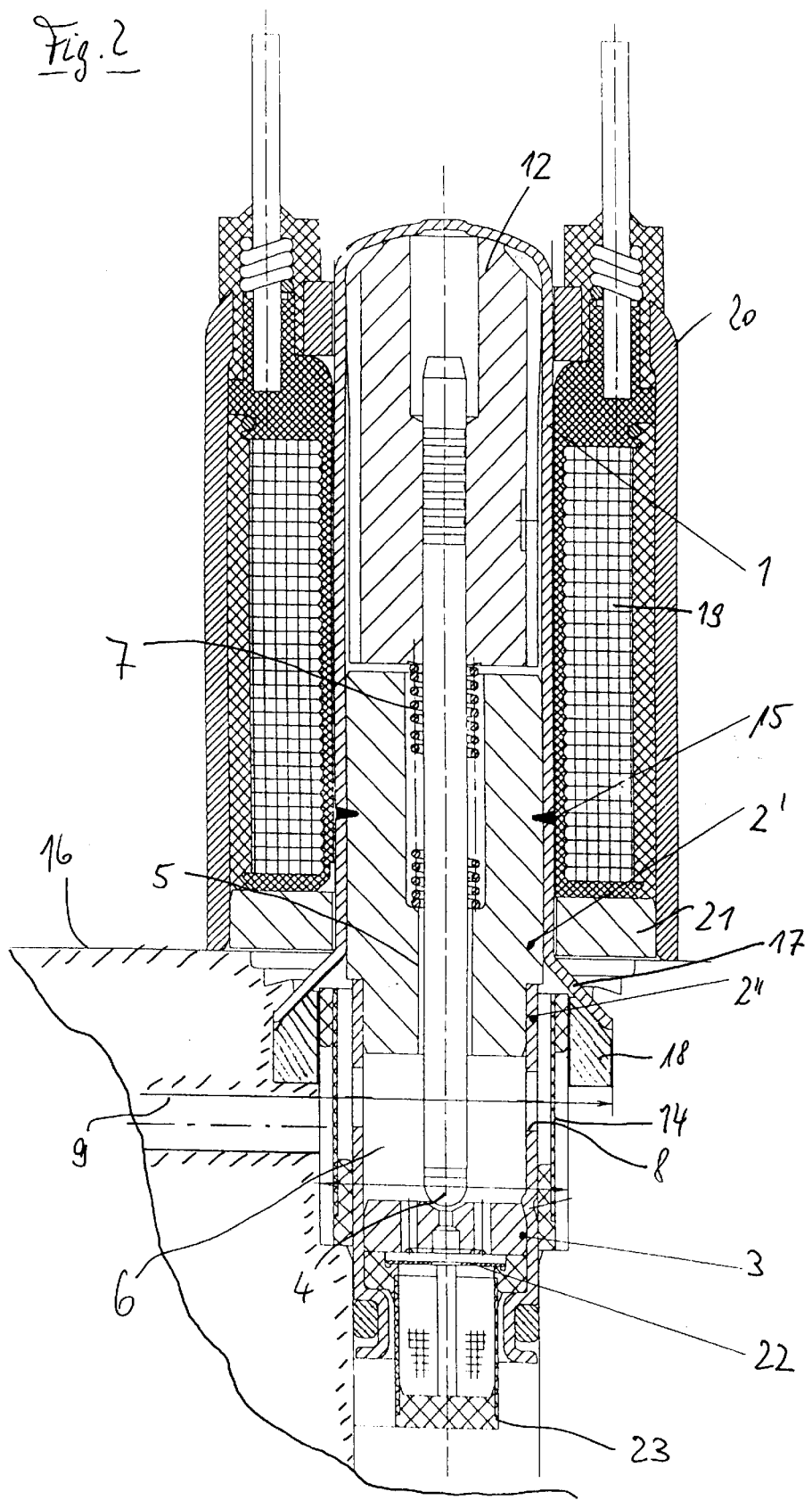
FIG. 2 is a variation of the electromagnetic valve shown in FIG. 1 in the area of the valve seat member and on the annular part close to the valve housing.

With reference to the features of the electromagnetic valve according to FIG. 1, now the structural differences compared to FIG. 1 will be shown by way of FIG. 2. As shown in FIG. 2, the annular part 2 completing the valve cartridge has a two-part design, with the thick-walled first annular part 2' configured as a magnetic core being press fitted into the thin-walled second annular part 2" which receives the valve seat member 3. The thin-walled second annular part 2" forms a subassembly of the electromagnetic valve, comprised of the valve seat member 3 disposed within the second annular part 2" and a plate-type non-return valve 22 arranged beneath the valve seat member 3 in the second annular part 2". Valve 22 is mounted inside a filter cartridge 23 that is also integrated in the second annular part 2". Another distinguishing feature in relation to the electromagnetic valve according to FIG. 1 is due to the arrangement of the annular filter 14 which, instead of being integrated in the annular part 2, is now arranged on the outside of the second annular part 2". With respect to the other details of the electromagnetic valve which have so far not been mentioned in the description of FIG. 2, the preceding explanations of the electromagnetic valve according to FIG. 1 will be referred to.

It shall not be left unmentioned in the comparison of both embodiments that regarding the details, still other alternatives or combinations are possible which are, however, of secondary importance to the present invention.

Figure 3:
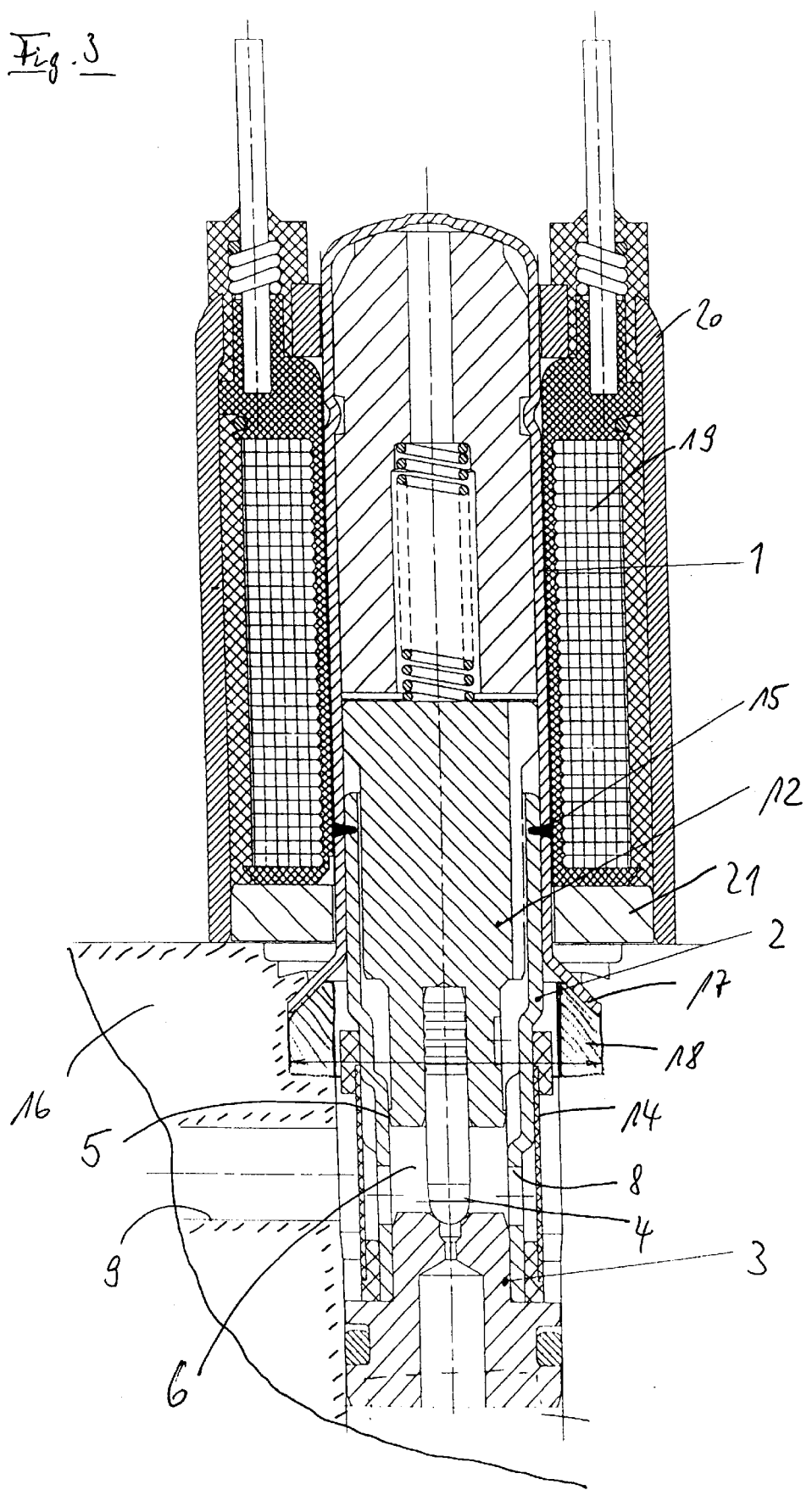
FIG. 3 is a closed electromagnetic valve, which is not energized magnetically in the inactive position and also is configured as a two-way/two-position directional control valve.

Finally, an embodiment for implementation of the present invention for an electromagnetic valve that is closed in its magnetically deenergized initial position according to FIG. 3 will be explained hereinbelow. FIG. 3 also shows the design which is essential for the present invention according to the preceding embodiments of FIGS. 1 and 2, comprised of a telescopically combined valve cartridge made up of a sleeve portion 1 which carries the valve coil 19, into which a thin-walled annular part 2 is press fitted and subsequently welded until the desired valve stroke is reached. Corresponding to the function of the electromagnetic valve, a magnetic core is disposed in the dome area of the sleeve portion 1 and has a stepped bore housing a spring that is active in the valve closing direction and supported on the front surface of the magnetic armature 12. The magnetic armature 12 is radially guided both in the area of the sleeve portion 1 and in the area of the annular part 2, with the result that the valve closure member 4 is aligned concentrically to the valve seat member 3 that is press fitted into the bottom area of the annular part 2 exactly as in the illustration according to FIG. 1. At the tapered cross-sectional area of the annular part 2, an annular filter 14 is in abutment on a bead of the valve seat member 3, thereby eliminating the need for the bottom bore step in the accommodating member 16, as is apparent from FIG. 2. As in FIG. 1, a comparatively straight bore portion is achieved in the accommodating member 16 so that the step of the valve accommodating bore in the accommodating member 16 is limited to the area where calking is effected. Therefore, FIG. 1 which has already been explained is referred to concerning details about the calking area and the other assemblies.

What is claimed is:

1. An electromagnetic valve, comprising:
   a dome-shaped sleeve portion having a closed end, an open end and an inner diameter,
   a magnetic armature slidingly received within the sleeve portion and carrying a valve closure member,
   an annular part having an outer diameter no larger than the inner diameter of the sleeve portion for enabling the annular part to be telescopically inserted into the open end of the sleeve portion, and
   a valve seat member having a stepped portion press fit into abutment with the annular part to align the valve seat member concentrically with the valve closure member,
   wherein a stroke of the magnetic armature is adjusted by an extent at which the annular part is telescopically inserted into the sleeve portion.

2. The electromagnetic valve as claimed in claim 1, wherein the annular part guides the magnetic armature and concentrically aligns the valve closure member in relation to the valve seat member when the annular part is telescopically inserted into the open end of the sleeve portion.

3. The electromagnetic valve as claimed in claim 2, wherein the annular part comprises a magnetic core having a stepped bore with a smaller-diameter portion for guiding the magnetic armature when the annular part is telescopically inserted into the open end of the sleeve portion.

4. The electromagnetic valve as claimed in claim 3, wherein the annular part includes a transverse bore for establishing a hydraulic connection between the stepped bore of the magnetic core and a pressure fluid conduit that leads to the electromagnetic valve.

5. The electromagnetic valve as claimed in claim 1, wherein the annular part has a two-part design including a thick-walled first annular part configured as a magnetic core press fit into a thin-walled second annular part that accommodates the valve seat member.

6. The electromagnetic valve as claimed in claim 5, wherein the sleeve portion and the annular part are made of a ferritic material.

7. The electromagnetic valve as claimed in claim 1, further including a diaphragm retainer press fit into a housing step of the valve seat member, and an annular gasket at a peripheral surface of the diaphragm retainer, the annular gasket having outside and inside shoulders disposed between the diaphragm retainer and an end surface of the valve seat member.

8. The electromagnetic valve as claimed in claim 1, further including an annular filter abutting the annular part and the valve seat member.

9. An electromagnetic valve, comprising:
   a dome-shaped valve housing having a closed end, an open end and an inner diameter,
   a magnetic armature sliding within the valve housing and including a valve closure member,
   a magnetic core having an outer diameter no larger than the inner diameter of the valve housing for enabling the magnetic core to be telescopically inserted into the open end of the valve housing, and
   a valve seat member having a stepped portion press fit into abutment with the annular part to align the valve seat member concentrically with respect to the valve closure member,
   wherein a stroke of the magnetic armature is adjusted by an extent at which the magnetic core is telescopically inserted into the valve housing.

10. The electromagnetic valve as claimed in claim 9, wherein the magnetic core includes a stepped bore with a smaller-diameter portion for guiding the magnetic armature when the magnetic core is telescopically inserted into the open end of the valve housing.

11. The electromagnetic valve as claimed in claim 8, wherein the magnetic core includes a transverse bore for establishing a hydraulic connection between the stepped bore of the magnetic core and a pressure fluid conduit that leads to the electromagnetic valve.

12. The electromagnetic valve as claimed in claim 8, wherein the valve housing and the magnetic core are made of a ferritic material.

13. The electromagnetic valve as claimed in claim 8, further including a diaphragm retainer press fit into a housing step of the valve seat member, and an annular gasket at a peripheral surface of the diaphragm retainer, the annular gasket having outside and inside shoulders disposed between the diaphragm retainer and an end surface of the valve seat member.

14. The electromagnetic valve as claimed in claim 8, further including an annular filter abutting the magnetic core and the valve seat member.

15. An electromagnetic valve, comprising:
a pre-assembled valve cartridge comprising:
  a valve housing having a closed end and an open end and a collar having an inclined surface at the open end thereof,
  a magnetic armature slidingly received within said valve housing and carrying a valve closure member, and
  a magnetic core telescopically inserted into the open end of the valve housing,
a subassembly comprising a valve seat member including a housing step, a diaphragm retainer press fit into the housing step, and a non-return gasket interposed between the diaphragm retainer and the valve seat member, the valve seat member of the subassembly is press fit into abutment with the annular part and aligned concentrically with respect to the valve closure member, and
a block-shaped accommodating member having a stepped bore,
wherein the electromagnetic valve is assembled by press fitting the pre-assembled valve cartridge into the stepped bore of the block-shaped accommodating member.

16. The electromagnetic valve as claimed in claim 5, further including a supporting plate arranged below the collar in the stepped bore of the accommodating member.

17. The electromagnetic valve as claimed in claim 5, further including a plate-type filter provided in the diaphragm retainer.

18. The electromagnetic valve as claimed in claim 5, wherein a stroke of the magnetic armature can be adjusted by a location at which said magnetic core is secured to the valve housing of the pre-assembled valve cartridge.

19. The electromagnetic valve as claimed in claim 15, wherein the magnetic core includes a stepped bore with a smaller-diameter portion for guiding the magnetic armature when the magnetic core is telescopically inserted into the open end of the valve housing.

20. The electromagnetic valve as claimed in claim 19, wherein the magnetic core includes a transverse bore for establishing a hydraulic connection between the stepped bore of the magnetic core and a pressure fluid conduit that leads to the electromagnetic valve.

21. The electromagnetic valve as claimed in claim 15, wherein the valve housing and the magnetic core are made of a ferritic material.

22. The electromagnetic valve as claimed in claim 15, further including a diaphragm retainer press fit into a housing step of the valve seat member, and an annular gasket at a peripheral surface of the diaphragm retainer, the annular gasket having outside and inside shoulders disposed between the diaphragm retainer and an end surface of the valve seat member.

23. The electromagnetic valve as claimed in claim 15, further including an annular filter abutting the magnetic core and the valve seat member.

* * * * *